Patented Nov. 27, 1934

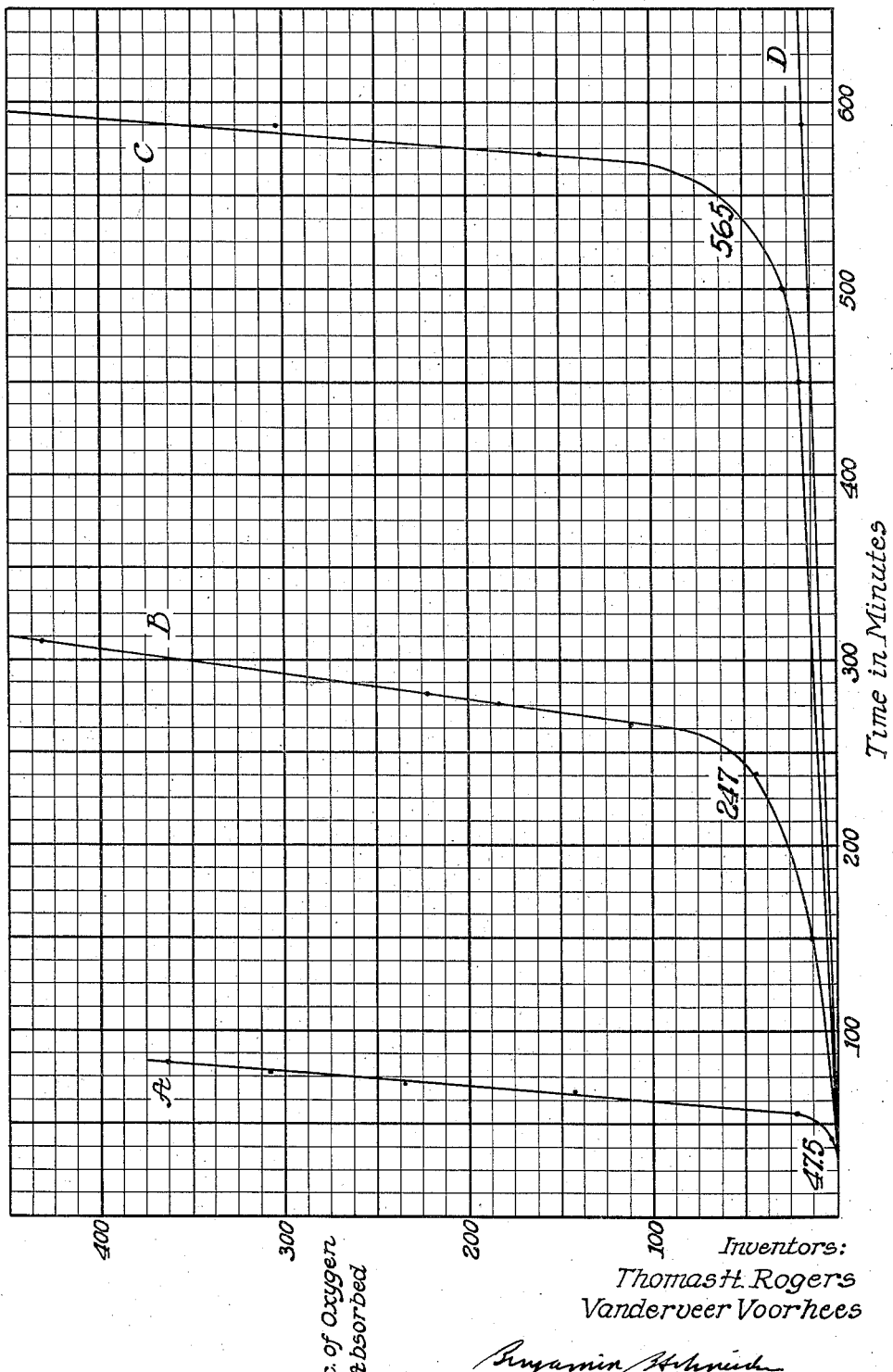

1,982,618

UNITED STATES PATENT OFFICE 1,982,618

MOTOR FUEL PRODUCT

Thomas H. Rogers and Vanderveer Voorhees, Whiting, Ind., assignors, by mesne assignments, to Gasoline Antioxidant Company, Wilmington, Del., a corporation of Delaware Application August 8, 1927, Serial No. 211,554

6 Claims. (Cl. 44—9)

The present invention relates to improvements in hydrocarbon motor fuel products of the nature of gasoline, and will be fully understood from the following description, illustrated by the accompanying drawing, in which the figure shows curves illustrating certain properties of a typical motor fuel product embodying the present invention under varying conditions of treatment.

In methods of cracking high boiling hydrocarbon oils to produce lower boiling hydrocarbon oils, the products which have been secured may in general be grouped in two classes; the first, which at the present time forms the bulk of pressure cracked gasoline, having an anti-knock value somewhat greater but not substantially greater than straight-run gasoline; a somewhat lower Baumé gravity than straight-run gasoline; containing a moderate proportion of unsaturated compounds as determined by combined absorption and polymerization by sulfuric acid in accordance with the method of determination hereafter set forth; and being in general of such a character that the constituents thereof which tend to form gum on storage and handling are readily removed by treatment with sulfuric acid to produce a product comparable in that respect to straight-run gasoline. Motor fuel products of the second general class hitherto derived principally from vapor phase processes or very high temperature pressure cracking processes, have anti-knock values substantially higher than straight-run gasoline; have a much lower A. P. I. gravity; contain large amounts of unsaturateds as determined by sulfuric acid absorption and polymerization; and require excessive treatment with sulfuric acid, with very substantial losses, to remove potential gum-forming constituents.

Although it cannot be said that there is a hard and fast line between the two types of products, the former type of product, with 425° F. end point will in general have an anti-knock value not exceeding an equivalent of 1.2 cubic centimeters of tetra-ethyl lead per gallon of straight-run Mid-Continent gasoline; an olefin content as determined by sulfuric acid absorption and polymerization of not over 40%; an A. P. I. gravity of 56 to 59°; and an oxygen absorption induction period greater than 125 minutes, as determined by the test hereafter set forth. The second type of product, which may be designated as the vapor phase type, will in general have an anti-knock value equivalent to at least 1.2 cc. tetra-ethyl lead per gallon straight-run Mid-Continent gasoline; an A. P. I. gravity of about 49 to 55°; an unsaturated content as determined by sulfuric acid absorption and polymerization exceeding 40%, and usually above 45%; and an oxygen absorption induction period of less than 125 minutes. The present invention has to do more particularly with improvements in the latter type of product, although it may also be occasionally embodied with benefit in products of the first mentioned type.

In determining the oxygen absorption induction period, by which an indication of the potential gum-forming properties of the gasoline on storage and handling may be secured, the following procedure may be employed: 100 cubic centimeters of the motor fuel or gasoline to be tested are placed in a one liter flask, the total volumetric capacity of which is 1150 to 1200 cubic centimeters. The gasoline is maintained at about 212° F. by heating in a steam bath while an oxygen atmosphere is maintained in the flask under a substantially constant pressure of about 2½ atmospheres. The flask is vigorously agitated and the volume of oxygen absorbed is measured at frequent intervals. The oxygen absorption is characterized by an initial period in which relatively small amounts are absorbed and subsequent to this period there is a rapid increase in the rate of absorption. This initial period of slow absorption, is designated the induction period and its end is regarded as the point at which oxygen absorption under the conditions stated reaches a rate of 1 cubic centimeter per minute. If the oxygen absorption is plotted against the time in minutes with equal distances on the coordinates for time in minutes and absorption in cubic centimeters, it will be evident that the end of the induction period will be indicated upon the curve by the point where the tangent to the curve has a slope of 45°. The curves presented in the chart forming the figure of the drawing are presented in this manner. The length of the induction period, as determined by this test, provides a fairly accurate indication of the potential gum-forming behavior of the motor fuel product on storage and handling; that is, the increase in gum-forming constituents, as shown by the usual gum tests, on such storage and handling. Such products are also found to have a tendency to deteriorate in anti-knock properties on storage and handling.

The motor fuel products with which the present invention is primarily concerned are produced from cracked distillate products of the vapor phase type which, after treatment with dilute sulfuric acid of 50 to 70% strength, have an oxygen absorption induction period of less than 125 minutes. The following procedure has been employed in producing such a product.

A hydrocarbon oil, preferably a distillate product heavier than gasoline, is forced through a continuous coil in a heating zone and brought therein to an outlet temperature of 825 to 975° F. while maintaining thereupon a pressure exceeding 200 lbs. under conditions to produce from 15 to 35% of hydrocarbons in the gasoline range boiling points in the products leaving the coil. The material leaving the coil is preferably reduced in pressure and fractionally condensed to separate the hydrocarbons in the gasoline range of boiling points as a distillate. The vaporization is controlled, or the distillate product may be rerun, to produce a material conforming to the desired specifications, for example, to 425° F. end point. Such a material has a gravity of 48 to 56° Baumé as compared with 58 to 60° Baumé for a straight-run gasoline of similar boiling range from Mid-Continent crude. The product, without treating, is found to have an oxygen absorption induction period of about 35 to 70 minutes. It is suitably treated with dilute sulfuric acid, say 60% acid, to the extent of 6 lbs. of such acid per barrel of distillate. The loss on treating is about ½%, the color of the product is not substantially altered, the color is substantially stabilized and the oxygen absorption induction period is increased to 80 to 90 minutes. In determining the unsaturateds in such a product it shows a combined absorption and polymerization loss of 50% to 70% when the test is made with 90% sulfuric acid. This loss is determined by subjecting a given volume of the material to treatment at room temperature with two volumes of 90% sulfuric acid, separating the remaining oil from the acid layer and redistilling the unabsorbed oil to produce a distillate having the same end point as the original material treated. The loss in volume relative to the original material is that which is designated as the combined absorption and polymerization loss.

The treated distillate product, produced as hereinbefore described, is then treated by adding thereto a small proportion of a nitrosophenol, the nitrosophenols having the property of increasing the induction period of the product substantially when used in proportions of, in general, less than 0.05%. The addition of the nitrosophenols likewise prevent deterioration in the anti-knock properties of the motor fuel products on storage and handling. As examples of other materials, we have successfully employed betanaphthol, the naphthylamines, diphenylamine and the phenylene diamines, aminophenols, pyrogallol, organic pyrogallates, nitrosophenols and the like.

The specific activity of these materials varies to a considerable extent, all of them however being effective in increasing the induction period within the limits hereinbefore set forth. Thus, with a product prepared as above described and which, after dilute acid treatment, has an induction period of 55 minutes and a lead equivalent of 1.7 cubic centimeters tetraethyl lead per gallon of straight-run Mid-Continent gasoline, the addition of 0.05% of betanaphthol increased the induction period to 130 minutes. Meta and paraphenylene-diamine, in proportions of 0.01 to 0.02%, increase the induction period to 160 to 175 minutes. Ortho and para-aminophenol, in proportions of 0.005%, increase the induction period to about 275 minutes, and to about 440 minutes respectively.

The drawing illustrates the action of a typical nitrosophenol designated when employed in connection with a similarly produced material having an induction period of 47½ minutes. The X coordinate of the chart expresses time in minutes and the Y coordinate cubic centimeters of oxygen absorbed. In connection with these curves, the end of the induction period is indicated by the point of contact of the curve with a tangent thereto having a slope of 45°. In this figure, curve A is that of oxygen absorption of the pressure distillate product, and as indicated on the curve, the induction period is approximately 47.5 minutes. Curve B shows the oxygen absorption characteristics of the same material, to which .002% para-nitrosophenol has been added, the induction period being now increased to 247. Curve C shows the oxygen absorption characteristics of the same material to which 0.01% of nicotine pyrogallate has been added, the induction period being 565 minutes. Curve D shows in part the oxygen absorption characteristics of the same material to which .01% of pyrogallol has been added, the induction period being beyond the limits of the plot and exceeding 850 minutes.

The marked extension of the oxygen absorption induction period by the addition of the substances having the characteristics of the bodies hereinbefore described is not accompanied by any change in the anti-knock value, 90% acid absorption and polymerization loss or other characteristic property of the motor fuel.

We claim:

1. The method of preserving vapor phase cracked motor fuels which comprises adding thereto a small proportion of a nitrosophenol.

2. The method of preserving vapor phase cracked motor fuels which comprises adding thereto less than 0.05% of para-nitrosophenol.

3. A motor fuel product consisting substantially entirely of hydrocarbons and being of a character showing a loss of upwards of 40% by absorption and polymerization by 90% sulfuric acid, said product containing a small proportion of a nitrosophenol.

4. A motor fuel product consisting substantially entirely of hydrocarbons and being of a character showing a loss of upwards of 40% by absorption and polymerization by 90% sulfuric acid, said product containing not more than 0.05% of para-nitrosophenol.

5. A motor fuel consisting mainly of cracked hydrocarbon distillates and which tends to deteriorate and develop gum on storage, and containing a small proportion of a nitrosophenol whereby gum-formation and deterioration thereof are retarded.

6. A motor fuel consisting mainly of cracked hydrocarbon distillates and which tends to deteriorate and develop gums on storage, and containing a small proportion of paranitrosophenol whereby gum-formation and deterioration thereof are retarded.

THOMAS H. ROGERS.
VANDERVEER VOORHEES.